May 12, 1931. E. W. DERR 1,805,038
MAT
Filed Nov. 11, 1927
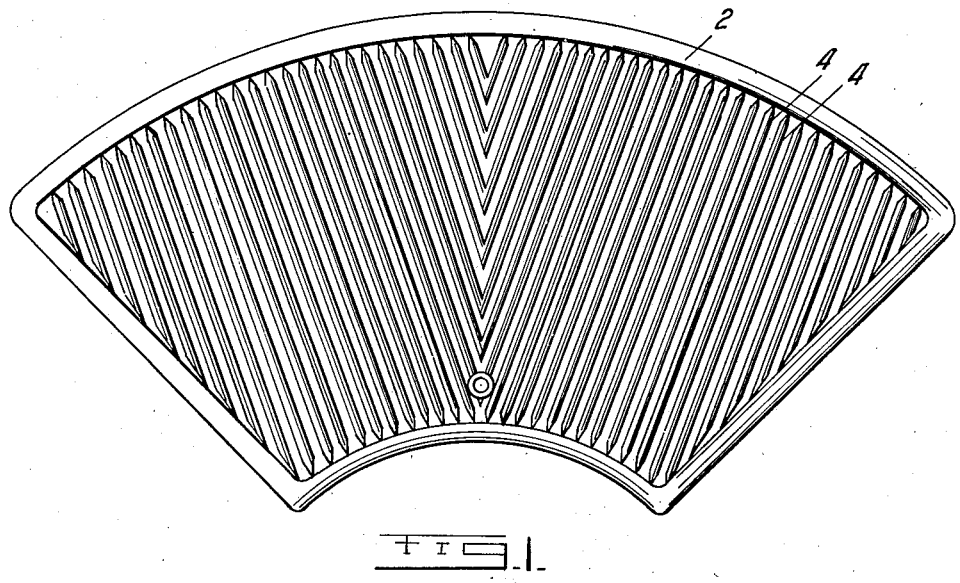
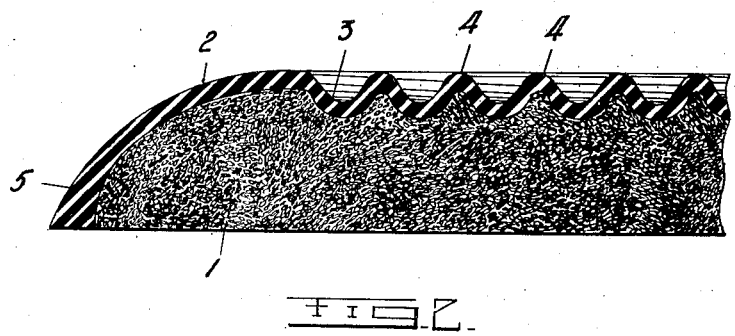
INVENTOR.
EARLE W. DERR.
BY Ely & Barrow
ATTORNEYS.

Patented May 12, 1931

1,805,038

UNITED STATES PATENT OFFICE

EARLE W. DERR, OF AKRON, OHIO, ASSIGNOR TO RUBBER CRAFT PRODUCTS COMPANY, OF AKRON, OHIO, A CORPORATION OF OHIO

MAT

Application filed November 11, 1927. Serial No. 232,569.

This invention relates to mats, stair pads, or other floor coverings. The invention is illustrated herein made in form suitable particularly for dentists, being shaped so as to fit at the side of a dentist's or barber's chair, although the shape and size of the finished article may be modified.

The object of the invention is to construct a soft, yielding mat which will relieve the user of the fatigue of standing for long periods of time. The mat is formed of a body of sponge rubber which affords yielding and cushioning properties. Sponge rubber, however, will be permanently deformed and will flatten and get out of shape. Having very little tensile strength it will wear away rapidly, particles breaking off easily, thereby destroying the surface of the mat. It has the additional objection of being hot upon the feet and thereby offsetting to a great extent its other valuable properties. It is the purpose of the invention to combine with a sponge rubber mat an outer covering or surface which will maintain the shape of the mat without interfering in any manner with the desirable yielding qualities thereof and will increase the life of the mat. It is also an object to so construct the mat that ventilation will always be obtained.

In the drawings,

Figure 1 is a plan of a mat made in sector shape so as to fit about the base of a dentist's chair; and Figure 2 is an enlarged cross-section of a piece of the mat showing its internal construction.

The mat or floor covering is made of a body of sponge rubber 1 which provides a cellular structure which is very soft and yielding and forms an admirable body for the purpose. In order, however, to prevent the permanent deformation of the sponge rubber, it is covered over with a comparatively heavy layer 2 of a firmer, less yielding rubber composition which is preferably of substantially the nature and composition of a tire tread stock. This cover layer is provided with a series of deep parallel corrugations or irregularities 3 which form a plurality of spaced arch-like surfaces 4 which constitute the wearing surface of the mat.

The body portion of the mat and its cover are vulcanized together, preferably in a single operation so that the sponge rubber completely fills the arches 4. The comparatively stiff rubber covering, being corrugated in the manner descirbed, will retain its form under any normal or even usually heavy pressures, and when the pressure is relieved, the mat will instantly spring back to its original condition. The grooves between the corrugations permit the circulation of air about the feet and the fatigue of long standing is relieved thereby.

It will be appreciated that the combination of soft sponge rubber body and the corrugated or roughened covering provides a form of mat which will keep its shape after indefinite use. This result is enchanced by the formation of the bevel or rounded edge 5 about the mat which confines the sponge rubber and prevents bulging about the edge of the mat. The roughened upper surface will also prevent slipping on the mat.

It is obvious that exact conformity with the details of construction is not essential, and that other formations of the upper surface may be resorted to without destroying the efficiency of the completed mat structure.

What is claimed is:

1. A mat or the like composed of a body of sponge rubber, and a comparatively thick covering layer of rubber of substantially the consistency of a tire tread stock of substantially even thickness throughout, the cover being formed with a plurality of closely spaced irregularities which present protuberances including sponge rubber, and being sufficiently unyielding so that they do not completely flatten out when pressure is applied thereto, the body of the mat and its cover being vulcanized together.

2. A mat or the like comprising a body of sponge rubber, and an outer covering of rubber of substantially even thickness throughout, the edges of the mat being beveled and enclosed by the cover, and the cover being formed on its upper surface with a plurality of closely spaced irregularities defining protuberances containing sponge rubber, the rubber comprising the cover being of sufficiently non-yielding strength to retain the irregularities therein under pressure.

3. A mat or the like comprising a body of sponge rubber, and an upper layer of rubber of substantially even thickness throughout, the upper layer being corrugated to provide a plurality of separated wearing surfaces provided by the crests of the corrugations in which sponge rubber is contained, said upper layer being of sufficient thickness and of a composition to retain its shape under pressure.

4. A one piece rubber mat comprising a body portion of sponge rubber, and an outer covering of solid rubber, the covering layer extending over the upper surface of the mat and around the edges thereof to confine the sponge rubber, the upper surface of the covering layer being of uniform thickness and provided with a plurality of self-sustaining undulations.

EARLE W. DERR.